United States Patent
Thompson et al.

[19]

[11] Patent Number: 5,917,951
[45] Date of Patent: Jun. 29, 1999

[54] CLUSTERED APERIODIC MASK

[75] Inventors: Gerhard Robert Thompson, Wappingers Falls; Charles P. Tresser, Mamaroneck; Chai Wah Wu, Ossining, all of N.Y.

[73] Assignee: International Business Machines Corporation, Armonk, N.Y.

[21] Appl. No.: 08/943,881

[22] Filed: Oct. 3, 1997

[51] Int. Cl.⁶ .............................. G06K 9/36; G06K 9/46; H04N 1/40

[52] U.S. Cl. ..................... 382/237; 382/205; 358/456; 358/457

[58] Field of Search .................... 358/455, 456, 358/457, 458; 382/232, 237, 205

[56] References Cited

U.S. PATENT DOCUMENTS 5,111,310  5/1992  Parker et al. ........................ 358/456
5,602,943  2/1997  Velho et al. ........................ 358/455

Primary Examiner—Thomas D. Lee
Attorney, Agent, or Firm—Whitham, Curtis & Whitham; Stephen C. Kaufman

[57] ABSTRACT

A technique combines most of the advantages of both blue noise and clustering in generating a clustered aperiodic mask and using it in a dither array algorithm for halftoning. The method of halftoning of grey scale images utilizes a pixel-by-pixel comparison of the image against a clustered aperiodic mask in which the clustered aperiodic mask is comprised of a partly random and partly deterministic single valued function which is designed to produce visually pleasing dot configurations when thresholded at any level of grey.

9 Claims, 3 Drawing Sheets

CLUSTERED APERIODIC MASK

BACKGROUND OF THE INVENTION

1. Field of the Invention

The present invention generally relates to halftoning techniques in printers and, more particularly, to a method and apparatus for halftoning which constructs and utilizes a clustered aperiodic mask in a dithering algorithm.

2. Background Description

Most printers today can print in only a limited number of colors. Digital halftoning is a technique for printing a picture (or more generally displaying it on some two-dimensional medium) using small dots with a limited number of colors such that it appears to consist of many colors when viewed from a proper distance. For example, a picture of black and white dots can appear to display grey colors when viewed from some distance.

The fastest and most commonly used methods for digital halftoning are dithering algorithms which use threshold arrays, also called dither matrices or dither masks. The original forms of these arrays used periodic patterns of threshold values which can have an unpleasant rendering at certain colors or grey levels.

One says that a mask is periodic if the size of the mask has (approximately) the minimal size required for a given number, L+1, of distinct grey levels to be rendered or if the arrangement of threshold values within the mask purposely forms periodic structures. In this context, aperiodic usually means "long period" which means that each of the L+1 threshold values is repeated a relatively large number of times in the mask in an aperiodic way. A typical example of an aperiodic mask is a large random one.

Too much randomness in the design of a dither array blurs the image and yields unaesthetic results. Based on the discovery that blue noise, or noise with the low frequencies attenuated, gives a good visual effect, as described for instance in "Dithering with blue noise", *Proc. IEEE* 76, no.1 (1988) pp. 56–79, by R. Ulichney, methods to construct dithering masks with blue noise were proposed for instance in U.S. Pat. No. 5,111,310 to K. J. Parker and T. Mitsa, by M. Yao and K. J. Parker in "Modified approach to the construction of a blue noise mask", *J. of Electronic Imaging* 3, no. 1, (1994) pp. 92–97, and in "The void-and-cluster method for dither array generation", *Proc. SPIE* 1913 (1993) pp. 332–343, by H. Ulichney.

However, such blue noise masks generate dispersed dots, which means in particular that black dots can only cluster if the grey level is dark enough to make it improbable or impossible to have all black dots isolated. As a consequence, they are not practical for laser printers or xerographic printers where one should cluster:

the black dots to improve both the consistency of the printed dots and the control of the dot overlaps, and the white dots to ensure they remain visible when rendering very dark grey levels.

To achieve clustering, one can use a traditional threshold array constructed so that increasing the grey level corresponds to printing larger and larger clusters at a fixed periodicity. This method does not produce unpleasant artifacts. However, either the number of grey levels that can be represented using such a method is too small or the clusters which are generated are too big. To correct these effects, one usually uses a multicell array, which includes several single-cluster threshold arrays. In a multicell array, several clusters are grown with the same spatial period as in the single-cluster array, but are not grown simultaneously with each other. This allows for additional intermediate grey levels. Traditional multicell masks are considered periodic and the order and manner in which the cells are grown commonly generates unpleasant periodic patterns at several grey levels.

Once a mask is devised for halftoning grey scale pictures, prior art allows it to be used for color pictures. The individual color planes are halftoned using rotated periodic masks, in order to avoid moire patterns, or other changes are made to aperiodic masks such as described for instance in U.S. Pat. No. 5,341,228 to K. J. Parker and T. Mitsa in the case of a blue noise mask.

Most of these techniques and others are reviewed in the book *Digital Halftoning*, MIT Press, Cambridge, Mass. (1987) by R. Ulichney, which is a general reference for digital halftoning.

One could be tempted to build blue noise masks by modifying existing methods to favor the formation of clusters. However, this generates unpleasant configurations of black dots for a large number of grey levels. The object of this invention is to describe a method which allows one to construct dither masks which are not random since clusters are formed by design (in nice patterns), but still present the same lack of periodicity which makes blue noise pleasant to the eye.

Existing halftone masks are either periodic, with or without clustering, or aperiodic, preferably blue noise. Blue noise masks do not have clustering.

This invention has the following advantages over existing methods by combining the advantages of clustering and blue noise patterns:

1. The mask generates clusters, which is desirable for certain applications and even mandatory for some of them.
2. The clusters are placed and grown in an aperiodic way which is partly random but visually pleasing.

Thus, this invention can be used where clustering is advantageous while avoiding global regularity or periodicity.

SUMMARY OF THE INVENTION

It is therefore an object of the present invention to provide a technique which combines most of the advantages of both blue noise and clustering in generating a clustered aperiodic mask and using it in a dither array algorithm for halftoning.

According to the invention, there is provided a method of halftoning of grey scale images by utilizing a pixel-by-pixel comparison of the image against a clustered aperiodic mask in which the clustered aperiodic mask is comprised of a partly random and partly deterministic single valued function which is designed to produce visually pleasing dot configurations when thresholded at any level of grey.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
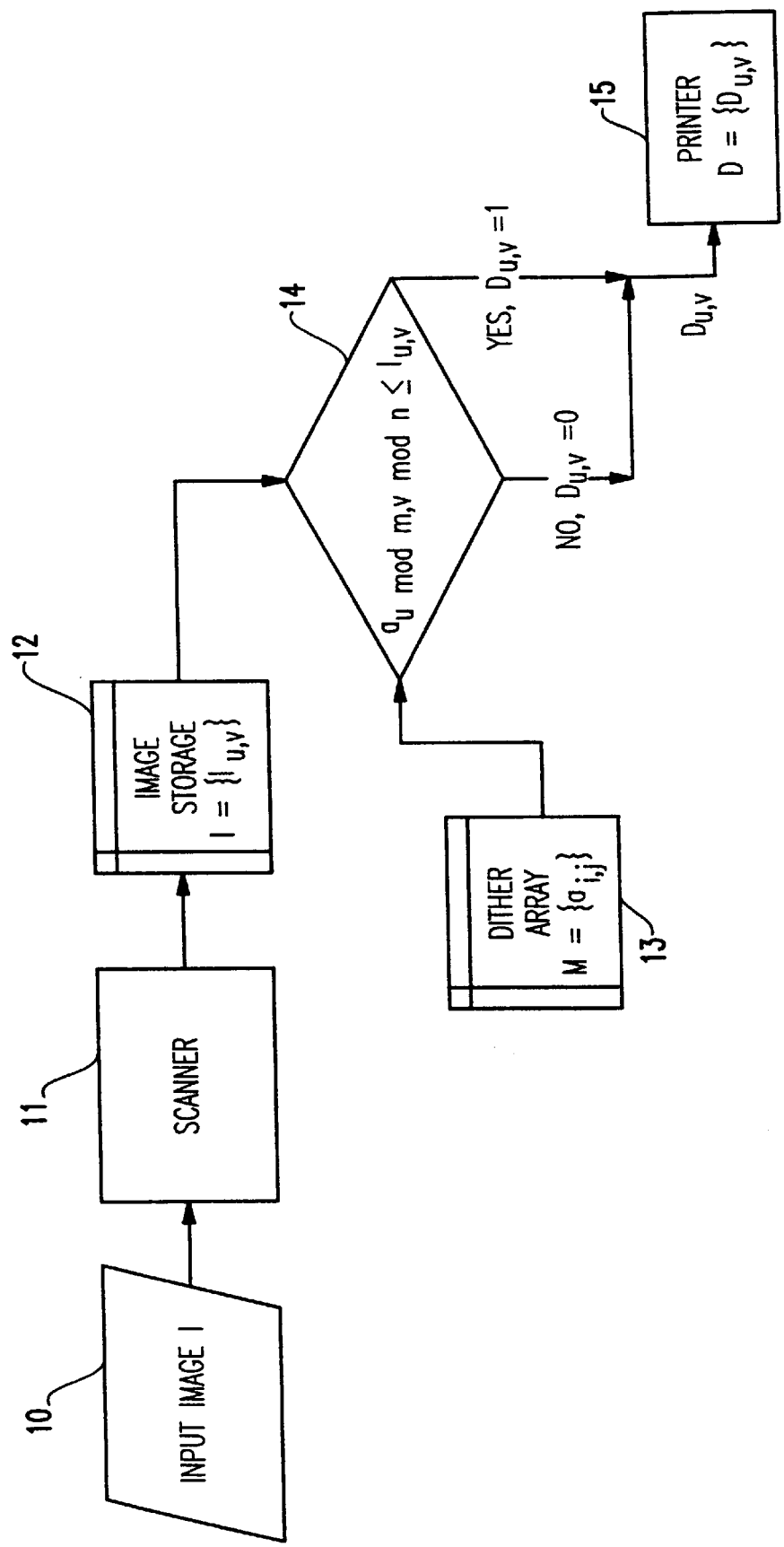
FIG. 1 is a block diagram of a halftoning system on which the invention may be implemented.

Referring now to the drawings, and more particularly to FIG. 1, there is shown in block diagram form the data flow from the input image to the printer. More specifically, the input image 10 is scanned by a scanner 11 and stored in image storage 12 as image $I_{u,v}$ where (u,v) is the pixel location. A dither matrix array 13 is used to halftone the image in storage 12.

If L+1 is the number of grey levels to be represented, any m×n matrix M={$a_{i,j}$} we consider in this description is an array of numbers between 0 and L. These numbers represent threshold levels. Any dithering algorithm works as follows. Using a dither matrix M={$a_{i,j}$} (block 13), the pixel at location (u,v) in image storage 12 will get printed as a black dot if and only if the grey level on the image to be printed at location (u,v) is greater than or equal to $a_{u',v'}$, where u'=u mod m, v'=v mod n. This is determined in the comparator 14, the output of which is sent to the printer 15. As usual in number theory, c mod d stands for the remainder of the division of c by d.

From the geometric point of view, the dither matrix M will be an m×n rectangular array (where m mod n stands for the number of pixels on each side), but (as is usually the case) its construction will be implemented by assuming periodic boundary conditions so that the array can be thought of as being a two dimensional torus. Whenever we speak of the distance between two points in the array or use a related concept, we mean the distance on the torus and not on the rectangle. We will also use the symbol M to designate the array given in the form of a matrix, and it should be clear whether we mean the rectangle, the torus, the matrix, or whichever.

With $\mathbb{R}$ standing for the set of real numbers, and $\mathbb{R}^2$ standing for the plane parameterized by two coordinates which are real numbers, we chose some function r:$\mathbb{R}^2 \rightarrow \mathbb{R}$ with a maximum at the origin and decreasing when moving away from the origin. To simplify the computation, the range of the potential will be chosen to be finite. The function r is to be interpreted as a potential function. The function r(x,y) will be chosen to depend on the distance from (x,y) to the origin, and the distance can be adapted to the particular printer, standard choices being the Euclidean distance ($\sqrt{x^2+y^2}$), |x|+|y| or max(|x|, |y|). For instance, r can be chosen to be $$e^{\frac{-x^2-y^2}{4.5}}$$

when |x| and |y| are smaller than the horizontal and vertical sizes of the mask respectively, and zero otherwise. Better results are obtained by choosing a potential r which depends on the grey level $g_i$ one works with (see function block 42 in FIG. 3).

A pattern is an m×n matrix of "0s" and "1s". The "0s" correspond to white pixels and the "1s" correspond to black pixels. To each pattern $P_i$ corresponds a grey level $g_i$ ($0 \leq g_i \leq 1$) which is defined as the proportion of black pixels in $P_i$. We choose a sequence of "good" patterns which are visually pleasing and/or desirable according to some criteria; e.g., a clustering criteria. Each pattern is used to render a particular level of grey. The sequence of patterns must satisfy a subset condition: for any two patterns $P_i$ and $P_{i+1}$, any pixel which is black in $P_i$ is also black in $P_{i+1}$. The number of patterns in this sequence is less than the total number of grey levels and contains at least two patterns: all "0s" and all "1s". Additional patterns are added corresponding to any intermediate patterns which are considered "good" and which we want to appear in the final mask. The dither mask is initialized so as to generate these patterns at the corresponding grey levels.

By clusters we mean any grouping of black dots. In the preferred embodiment, this grouping might be chosen to favor reproducibility or allow visibility of white dots when the grey level is high. Printing on a laser or xerographic printer has such requirements. We do not necessarily aim at forming clusters as round as possible; the clusters could have complex shapes. The shape of the clusters may depend on the printer or on the type of documents one intends to print. In the preferred embodiment, the clusters are formed by adding dots which are adjacent to each other. The property of being adjacent is determined according to the application and can depend on the grey level being dealt with (i.e., the number of black pixels in the pattern). For example, in one application two pixels may be considered adjacent if they are immediate vertical or horizontal neighbors. In another application, diagonal relationships may be preferred.

To complete the mask, the entries of the mask for halftoning intermediate grey levels are determined by using the potential r to satisfy both an aperiodicity criterion and a clustering criteria.

Figure 2:
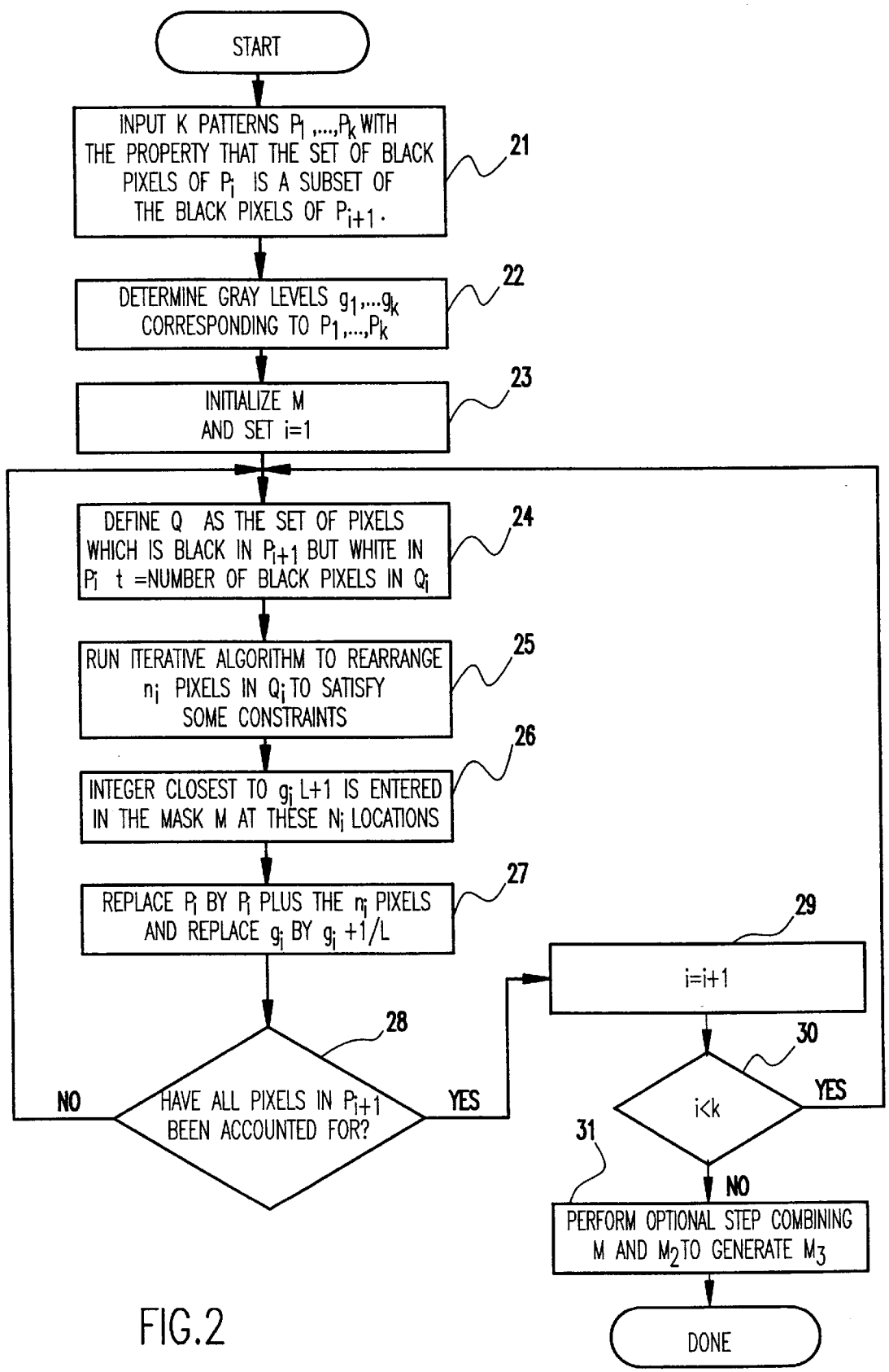
FIG. 2 is a flow diagram showing the process of generating a clustered aperiodic dither matrix for the system of FIG. 1.

A flowchart of the algorithm which generates a clustered aperiodic dither matrix M (for use in FIG. 1) is shown in FIG. 2. First we choose in function block 21 an ordered sequence of k "good" patterns of black and white pixels $P_1, \ldots, P_k$ satisfying the subset condition as described earlier. Each pattern has size m×n. Recall that for each pattern $P_i$, the corresponding grey level $g_i$ ($0 \leq g_i \leq 1$) is defined as $g_i$=(number of black pixels in $P_i$)/(m×n), as determined in function block 22.

In the preferred embodiment, the patterns $P_i$ are (possibly periodic) patterns which look pleasant. For example, one of the patterns could be where the black pixels are arranged in a checkerboard pattern.

We choose $P_1$ as the zero matrix (pattern of all white pixels); i.e., the corresponding grey level $g_0$ is equal to 0. We choose $P_k$ as the pattern of all black pixels (i.e., a matrix of all "1s") with the corresponding grey level $g_k$=1.

Recall that L+1 is the number of grey levels to be represented and M is the m×n dither matrix.

We first initialize the mask M in function block 23 as follows:

1. For each black pixel in $P_1$, we set the corresponding entry in M to be $g_1 \times L$, rounded to an integer.
2. For each black pixel in $P_2$ which is not in $P_1$, we set the corresponding entry in M to be $g_2 \times L$, rounded to an integer.
3. For each back pixel in $P_i$ which is not in $P_1, \ldots, P_{i-1}$, we set the corresponding entry in M to $g_i \times L$, rounded to an integer.

Next, we complete the mask in the following way. For each pair of adjacent patterns $P_i$ and $P_{i+1}$, we fill in the mask to generate the halftones for the grey levels between $g_i$ and $g_{i+1}$.

Starting with i=1, we define in function block 24 $Q_i$ as the set of pixels which is black in $P_{i+1}$ but not in $P_1$. The number of pixels in $Q_i$ is denoted $t_i$. Choose an integer $n_i$ approximately equal to $t_i/(L \times (g_{i+1}-g_i))$. Next, an iterative scheme (FIG. 3) is used in function block 25 to rearrange $n_i$ pixels in $Q_i$ such that they satisfy three constraints:

I. These $n_i$ pixels remain within $Q_i$;
II. These $n_i$ pixels, along with $P_i$, form a sufficiently aperiodic pattern; and
III. These $n_i$ pixels, along with $P_i$ satisfy some clustering criteria.

After that, the integer closest to $g_i \times L+1$ is entered in the mask at these $n_i$ locations (function block 26). This guarantees that $P_i$ plus these pixels will be the pattern corresponding to a grey level approximately equal to $g_i+1/L$.

We replace $P_i$ by $P_i$ plus the $n_i$ pixels and replace $g_i$ by $g_i+1/L$ in function block 27. We then repeat the above steps by jumping back to function block 24. This continues until all grey levels between $g_i$ and $g_{i+1}$ are accounted for; i.e., we have placed an entry in M at the locations of all black pixels in $P_{i+1}$. This is tested in function block 28.

We then increase i (in function block 29) to fill in the mask for the grey levels between the next pair of grey levels ($g_i$, $g_{i+1}$) by jumping back to function block 24. This continues until the entire mask M is finished; i.e., all the grey levels have been taken care of. This is tested for in function block 30.

Figure 3:
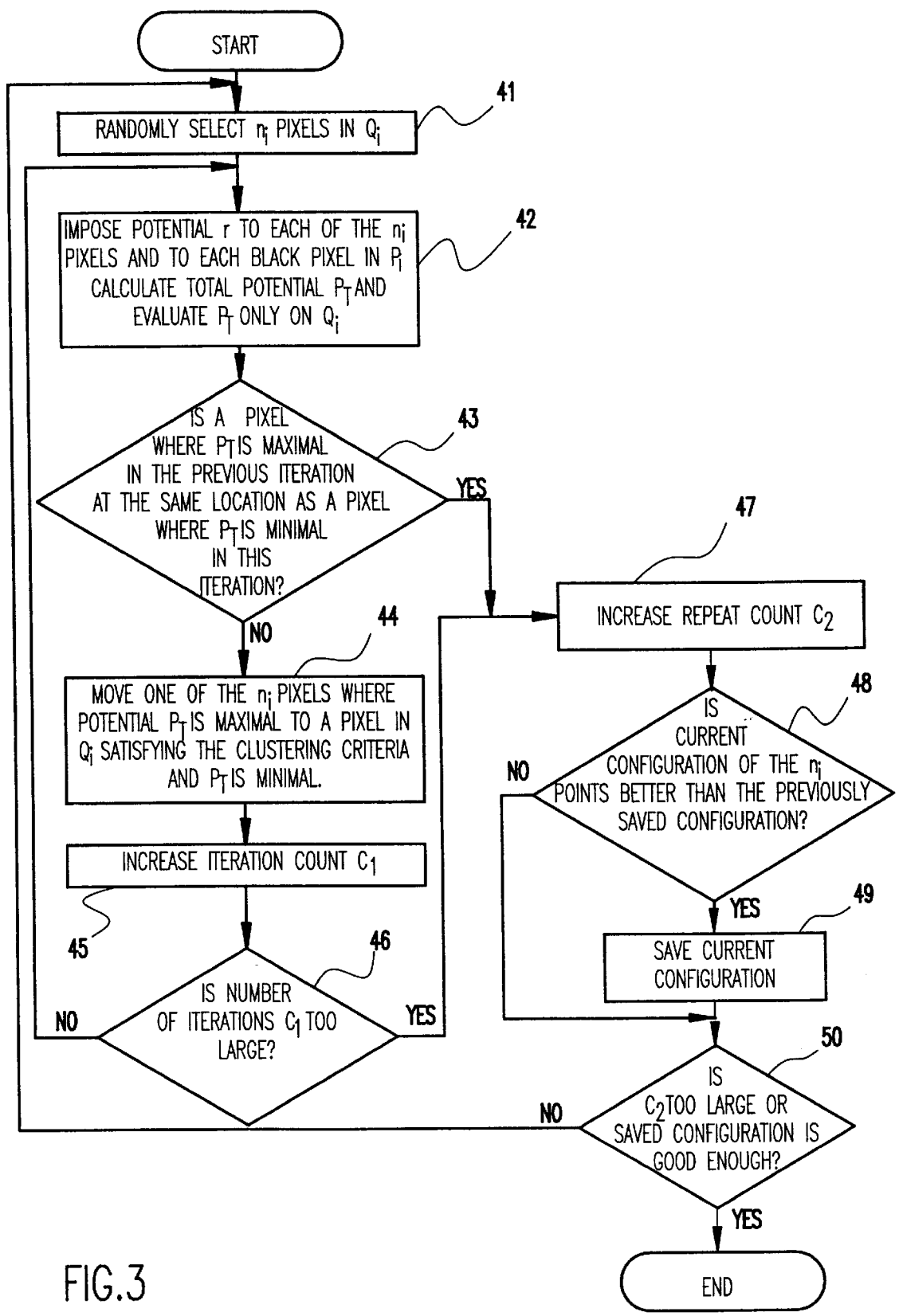
FIG. 3 is a flow diagram showing the iterative procedure for arranging pixels called by the process of FIG. 2.

The iterative scheme for arranging the $n_i$ pixels (function block 25) is implemented in the following way, as shown in FIG. 3.

In function block 41, we randomly select $n_i$ locations in $Q_i$ satisfying the clustering criteria. We impose a potential r centered on each of the $n_i$ points and on each of the black pixels in $P_i$ (function block 42). The sum of the potentials, which we denote by $P_T$ (the total potential) is then calculated only for each point in $Q_i$ which satisfies the clustering criteria. The potential r can depend on $g_i$.

A test is made in decision block 43 to determine if a pixel having the minimal total potential $P_T$ is a pixel with the maximal total potential $P_T$ in the previous iteration (at the first iteration, this test is not done and the algorithm jumps directly to function block 44). If so, the algorithm jumps to function block 47. Otherwise, in function block 44 one of these $n_i$ points with the highest total potential $P_T$ is moved to a point in $Q_i$ satisfying the clustering criteria with the lowest total potential $P_T$ (among the points in $Q_i$ satisfying the clustering criteria). The iteration count $C_1$ is then incremented in function block 45. A test is made in decision block 46 to determine if the iteration count $C_1$ is larger than some predetermined maximum. If so, the algorithm jumps to function block 47. Otherwise, the algorithm jumps back to function block 42 to start another iteration. In function block 47, the repeat count $C_2$ is increased. Then in function block 48, a test is made to see if the current configuration of the $n_i$ points is better than the previously saved configuration (better could mean, for instance, that the largest value minus the smallest value of the corresponding $P_T$ over all points in $Q_i$ satisfying the clustering criteria is smaller). If so, the current configuration is saved in function block 49. A test is made in decision block 50 to see if $C_2$ is larger than some predetermined maximum or if the saved configuration of the $n_i$ locations form a sufficiently blue pattern. If not, a new random set of $n_i$ locations in $Q_i$ is chosen by jumping to function block 41. Otherwise, the saved configuration of the $n_i$ points will be the final configuration to be used in function block 25.

The clustering criteria used in the preferred embodiment can be stated as follows: A pixel in $Q_i$ satisfies the clustering criteria if either $g_i$ is less than h or the pixel is adjacent to black pixels in $P_i$. In the preferred embodiment, a pixel a is adjacent to another pixel b if a is one of the eight immediate neighbors of b. Another definition of adjacent that can be used is: a pixel a is adjacent to pixel b if a is immediately above, below, to the left or to the right of b. The number h indicates that the pattern for $g_i<h$ does not need to be clustered. Roughly speaking, the number h is determined by the number of cells in the mask.

An optional step (function block 31) can be used to combine the generated m×n mask M with another predefined $m_2 \times n_2$ mask $M_2$ into a larger $(m \times m_2) \times (n \times n_2)$ mask $M_3$. For instance, M could be generated with k=3, h=1 and $P_2$ a checkerboard pattern (recall that $P_1$ is all zeros and $P_k$ is all ones), while $M_2$ is a clustered dither array with a single cluster. For this example, the generated $M_3$ mask would be a clustered mask where the clusters are grown at 45° angles in an aperiodic way. Treating M, $M_2$, and $M_3$ as matrices, the pseudocode shown below generates $M_3$ in the preferred embodiment, where we use the notation M(i,j) to indicate the entry of M in the $i^{th}$ row and $j^{th}$ column.

```
for i=1 to m
  for j=1 to n
    for i2=1 to m2
      for j2=1 to n2
        if (M(i,j)<0.5*L) then
          M3((i-1)*m2+i2, (j-1)*n2+j2)=
            (0.5*M2(i2,j2)*n2*m2-0.5*L+M(i,j)-
            L/(n*m))/(n2*m2)-0.5+0.5/(n2*m2)
        else
          M3((i-1)*m2+i2,(j-1)*n2+j2)=0.5*L+
            (0.5*(L-M2(i2,j2))*n2*m2+
            (L-M(i,j)))/(n2*m2)-0.5;
        end if
      end for
    end for
  end for
end for
round entries of M3 to nearest integer
```

Because $M_3$ can be much larger than M and $M_2$, we can create a very large dither array $M_3$ while the main intensive computations are performed to generate the relatively smaller mask M.

If this optional step is used, the dither mask $M_3$ will be used (rather than M) to halftone the image in FIG. 1.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for the halftoning of grey scale images comprising the steps of:

comparing pixel-by-pixel of the image against a clustered aperiodic mask in which the clustered aperiodic mask is comprised of a partly random and partly deterministic single valued function designed to produce visually pleasing dot configurations when thresholded at any level of grey; and printing either a black dot or a white dot depending on an outcome of the comparing step.

2. The method of halftoning of grey scale images recited in claim 1 wherein the clustered aperiodic mask used in the step of pixel-by-pixel comparison has dot configurations which satisfy a clustering criteria for enhancing reproducibility on laser or xerographic printers and satisfy some aperiodicity criteria for the purpose of being visually pleasing.

3. The method of halftoning of grey scale images recited in claim 1 wherein said clustered aperiodic mask is used to halftone a color image.

4. The method of halftoning of grey scale images recited in claim 1 wherein said clustered aperiodic mask is used to halftone multibit displays.

5. A method of generating a clustered aperiodic dither matrix used in halftoning grey scale images comprising the steps of:

choosing an ordered sequence of k patterns of black and white pixels $P_1, \ldots, P_k$, each pattern having size m×n, each pattern $P_i$ the corresponding grey level $g_i$ ($0 \leq g_i \leq 1$) being defined as $g_i$=(number of black pixels in $P_i$)/(m×n);

initializing a mask M by for each black pixel in $P_1$, setting a corresponding entry in M to be $g_1 \times L$, rounded to an integer, L+1 being equal to a maximum number of grey levels to be represented, for each black pixel in $P_2$ which is not in $P_1$, setting a corresponding entry in M to be $g_2 \times L$, rounded to an integer, and for each black pixel in $P_i$ which is not in $P_1, \ldots, P_{i-1}$, setting a corresponding entry in M to $g_i \times L$, rounded to an integer;

for each pair of adjacent patterns $P_i$ and $P_{i+1}$, filling in the mask to generate halftones for grey levels between $g_i$ and $g_{i+1}$;

starting with i=1, defining $Q_i$ as a set of pixels which is black in $P_{i+1}$ but not in $P_i$, the number of pixels in $Q_i$ being denoted $t_i$, and choosing an integer $n_i$ approximately equal to $t_i/(L \times (g_{i+1} - g_i))$;

iteratively rearranging $n_i$ pixels in $Q_i$ such that they satisfy the constraints:

the $n_i$ pixels remain within $Q_i$, the $n_i$ pixels, along with $P_i$, form a sufficiently aperiodic pattern, and the $n_i$ pixels, along with $P_i$ satisfy some clustering criteria;

entering the integer closest to $g_i \times L + 1$ in the mask at the $n_i$ locations so that $P_i$ plus these pixels will be the pattern corresponding to a grey level approximately equal to $g_i + 1/L$;

replacing $P_i$ by $P_i$ plus the $n_i$ pixels and replace $g_i$ by $g_i + 1/L$ and repeating the above steps until all grey levels between $g_i$ and $g_{i+1}$ are accounted for by placing an entry in M at locations of all black pixels in $P_{i+1}$; and increasing i to fill in the mask for grey levels between a next pair of grey levels ($g_i$, $g_{i+1}$) until the entire mask M is finished.

6. A printer control for the halftoning of grey scale images comprising:

a clustered aperiodic mask comprised of a partly random and partly deterministic single valued function designed to produce visually pleasing dot configurations when thresholded at any level of grey a comparator comparing pixel-by-pixel an input image against the clustered aperiodic mask; and an output circuit generating a printer command to print either a black dot or a white dot depending on an output from the comparator.

7. The printer control recited in claim 6 wherein the clustered aperiodic mask has dot configurations which satisfy a clustering criteria for enhancing reproducibility on laser or xerographic printers and satisfy some aperiodicity criteria for the purpose of being visually pleasing.

8. The printer control recited in claim 6 wherein said clustered aperiodic mask is used to halftone a color image.

9. The printer control recited in claim 6 wherein said clustered aperiodic mask is used to halftone multibit displays.

* * * * *